(12) United States Patent
Murray (10) Patent No.: US 12,435,665 B2
(45) Date of Patent: Oct. 7, 2025

(54) BLOWER SYSTEM

(71) Applicant: ROLLS-ROYCE plc, London (GB)

(72) Inventor: Christopher A Murray, Nottingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 19/041,155

(22) Filed: Jan. 30, 2025

(65) Prior Publication Data

US 2025/0270952 A1    Aug. 28, 2025

(30) Foreign Application Priority Data

Feb. 23, 2024  (GB) ...................... 2402555

(51) Int. Cl.
*F02C 6/06* (2006.01)
*B64D 13/02* (2006.01)

(52) U.S. Cl.
CPC ............... *F02C 6/06* (2013.01); *B64D 13/02* (2013.01); *F05D 2220/323* (2013.01); *F05D 2220/76* (2013.01)

(58) Field of Classification Search
CPC ........ F05D 2220/76; F02C 6/06; B64D 13/02
See application file for complete search history.

(56) References Cited

U.S. PATENT DOCUMENTS 7,797,962 B2 * 9/2010 Kresser .................. B64D 13/06 62/401
9,205,925 B2 * 12/2015 Bruno .................... B64D 13/02
(Continued)

FOREIGN PATENT DOCUMENTS

| EP | 3 517 436 B1 | 5/2020 |
|---|---|---|
| EP | 3 517 437 B1 | 5/2020 |
| EP | 3 517 438 B1 | 6/2020 |

*Primary Examiner* — Nathaniel E Wiehe
*Assistant Examiner* — Jason G Davis
(74) *Attorney, Agent, or Firm* — Oliff PLC (57) ABSTRACT

A blower system for supplying pressurized air to an airframe of an aircraft comprises: an air inlet for receiving air from an air source; an air outlet for supplying pressurized air to an airframe; a blower compressor in fluid communication with the air inlet and the air outlet, the blower compressor comprising a first rotor and a second rotor, wherein the first and second rotors are independently rotatable in order to compress air received from the air inlet and deliver the compressed air to the air outlet; a variable transmission comprising a first output for driving the first rotor, a second output for driving the second rotor, and first, second and third inputs; and first and second electrical machines, each comprising an electric rotor and an electric stator, wherein: the first input of the variable transmission is configured to be mechanically coupled to a spool of a gas turbine engine; the second input of the transmission is mechanically coupled to the electric rotor of the first electrical machine; the third input of the transmission is mechanically coupled to the electric rotor of the second electrical machine; and the electric stators of the first and second electrical machines are electrically connected to an electrical power management system configured to control the supply of electrical power to the first and second electrical machines in order to control the speed of the first and second outputs of the variable transmission.

19 Claims, 9 Drawing Sheets

(56) References Cited

U.S. PATENT DOCUMENTS

| | | |
|---|---|---|
| 11,913,388 B2 | 2/2024 | Eryilmaz et al. |
| 2016/0167789 A1* | 6/2016 | Knight .................. B64D 31/14 454/71 |
| 2022/0161932 A1 | 5/2022 | Sharpe |
| 2022/0355939 A1 | 11/2022 | Eryilmaz et al. |

* cited by examiner

BLOWER SYSTEM

CROSS-REFERENCE TO RELATED APPLICATIONS

This specification is based upon and claims the benefit of priority from UK Patent Application Number GB2402555.3 filed on Feb. 23, 2024, the entire contents of which are incorporated herein by reference.

BACKGROUND

1. Field of the Disclosure

The present disclosure relates to a blower system for an aircraft. The present disclosure also concerns a gas turbine engine assembly and an aircraft comprising the blower assembly.

2. Description of the Related Art

It is known to pressurise a cabin of an aircraft using an air pressurisation system which makes use of engine bleed air which is bled from a compressor section of the core of a gas turbine engine. Bleeding high pressure air from the gas turbine engine reduces its efficiency and thereby increases its fuel consumption.

It is therefore desirable to provide an improved air pressurisation system. Air pressurisation systems which make use of air which is taken from a lower pressure source of a gas turbine engine, such as a bypass duct, and which subsequently compress the air prior to delivering it to the cabin are also known. Some exemplary air pressurisation systems are described in EP3517436 B1, EP3517437 B1 and EP3517438 B1.

SUMMARY

According to an aspect of the present disclosure, there is provided a blower system for supplying pressurized air to an airframe of an aircraft, the blower system comprising: an air inlet for receiving air from an air source; an air outlet for supplying pressurized air to an airframe; a blower compressor in fluid communication with the air inlet and the air outlet, the blower compressor comprising a first rotor and a second rotor, wherein the first and second rotors are independently rotatable in order to compress air received from the air inlet and deliver the compressed air to the air outlet; a variable transmission comprising a first output for driving the first rotor, a second output for driving the second rotor, and first, second and third inputs; and first and second electrical machines, each comprising an electric rotor and an electric stator, wherein: the first input of the variable transmission is configured to be mechanically coupled to a spool of a gas turbine engine; the second input of the transmission is mechanically coupled to the electric rotor of the first electrical machine; the third input of the transmission is mechanically coupled to the electric rotor of the second electrical machine; and the electric stators of the first and second electrical machines are electrically connected to an electrical power management system configured to control the supply of electrical power to the first and second electrical machines in order to control the speed of the first and second outputs of the variable transmission.

The blower system may further comprise a third electrical machine comprising an electric rotor and an electric stator. The electric rotor of the third electrical machine may be configured to be mechanically coupled to a spool of a gas turbine engine of the aircraft, whereby the third electrical machine is operable to generate electrical power from the spool of the gas turbine engine. The electric stator of the third electrical machine may be electrically connected to the electrical power management system for supplying the generated electrical power to the electrical power management system.

The electric stators of the first and second electrical machines may be operable to receive electrical power generated by the third electrical machine, e.g. via the electrical power management system.

The variable transmission may comprise two sun gears, two sets of planet gears meshingly engaged with the two sun gear respectively, and two ring gears meshingly engaged with the two sets of planet gear respectively. The planet gears of the first set of planet gears may be rotatable independently of the gears of the second set of planet gears.

The first input may be formed by a common planet carrier of the first and second sets of planet gears. The second input may be formed by the first ring gear and the third input is formed by the second ring gear.

Alternatively, the variable transmission may comprise two sun gears, two sets of planet gears meshingly engaged with the two sun gear respectively, and a common ring gear meshingly engaged with the two sets of planet gear. The first input may be formed by the common ring gear. The second input may be formed by a first planet carrier of one of the sets of planet gears, and the third input is formed by a second planet carrier of the other of the sets of planet gears.

The first output may be formed by the first sun gear. The second output may be formed by the second sun gear.

The variable transmission may comprise a first driven gear mechanically coupled to the first sun gear. The variable transmission may further comprise a first output shaft coupled to the first driven gear for mechanically coupling the first driven gear to the first rotor of the blower compressor.

The variable transmission may comprise a second output shaft mechanically coupled to the second sun gear for mechanically coupling the second sun gear to the second rotor of the blower compressor. The first and second output shafts may extend away from the first and second sun gears respectively in the same direction as one another.

The variable transmission may comprise a first output shaft mechanically coupled to the first sun gear for mechanically coupling the first sun gear to the first rotor of the blower compressor. The variable transmission may further comprise a second output shaft mechanically coupled to the second sun gear for mechanically coupling the second sun gear to the second rotor of the blower compressor. The first shaft may extend through a hollow interior of the second shaft. Alternatively, the second shaft may extend through a hollow interior of the first shaft.

The variable transmission may further comprise an output spur gear meshingly engaged with an auxiliary sun gear coupled to the second sun gear via a sun gear shaft. The output spur gear may be for mechanically coupling to the second rotor of the blower compressor.

One of the first and second rotors may be a low pressure rotor of the blower compressor and the other of the second rotors is a high pressure rotor of the blower compressor.

A gas turbine engine for an aircraft may comprise the above-mentioned blower system. The gas turbine engine may further comprise an accessory gear box for coupling the first input to the spool of the gas turbine engine.

The gas turbine engine may comprise: an engine core comprising a turbine, a compressor, and a core shaft connecting the turbine to the compressor.

The gas turbine engine may comprise: a fan located upstream of the engine core, the fan comprising a plurality of fan blades. The gas turbine engine may further comprise a gearbox that receives an input from the core shaft and outputs drive to the fan so as to drive the fan at a lower rotational speed than the core shaft.

The turbine may be a first turbine, the compressor may be a first compressor, and the core shaft may be a first core shaft.

The engine core may further comprise a second turbine, a second compressor, and a second core shaft connecting the second turbine to the second compressor. The second turbine, second compressor, and second core shaft may be arranged to rotate at a higher rotational speed than the first core shaft.

An aircraft may comprise the above-mentioned blower system or the above-mentioned gas turbine engine.

An aircraft may comprise an airframe, a gas turbine engine and the above mentioned blower system. The blower compressor may be located within the gas turbine engine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

According to an aspect, there is provided an aircraft comprising a cabin blower system or a gas turbine engine as described and/or claimed herein.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION OF THE DISCLOSURE

Figure 1:
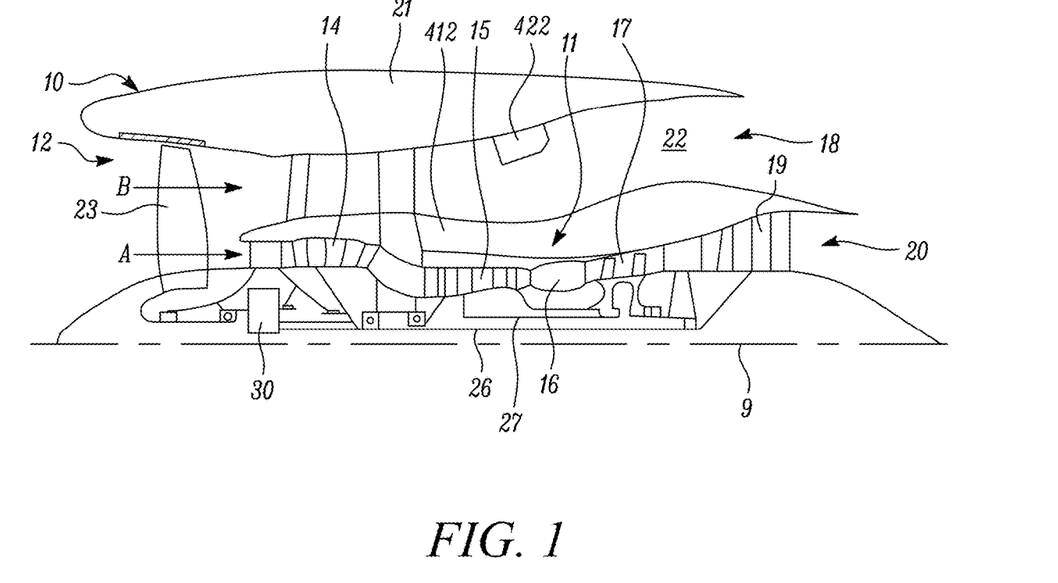
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
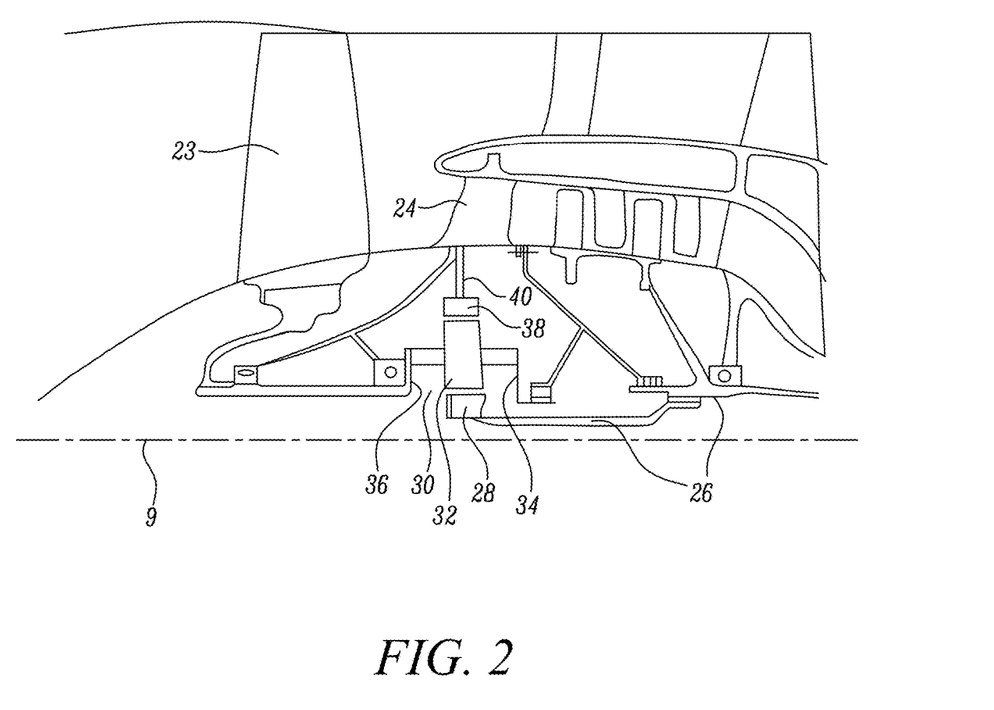
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
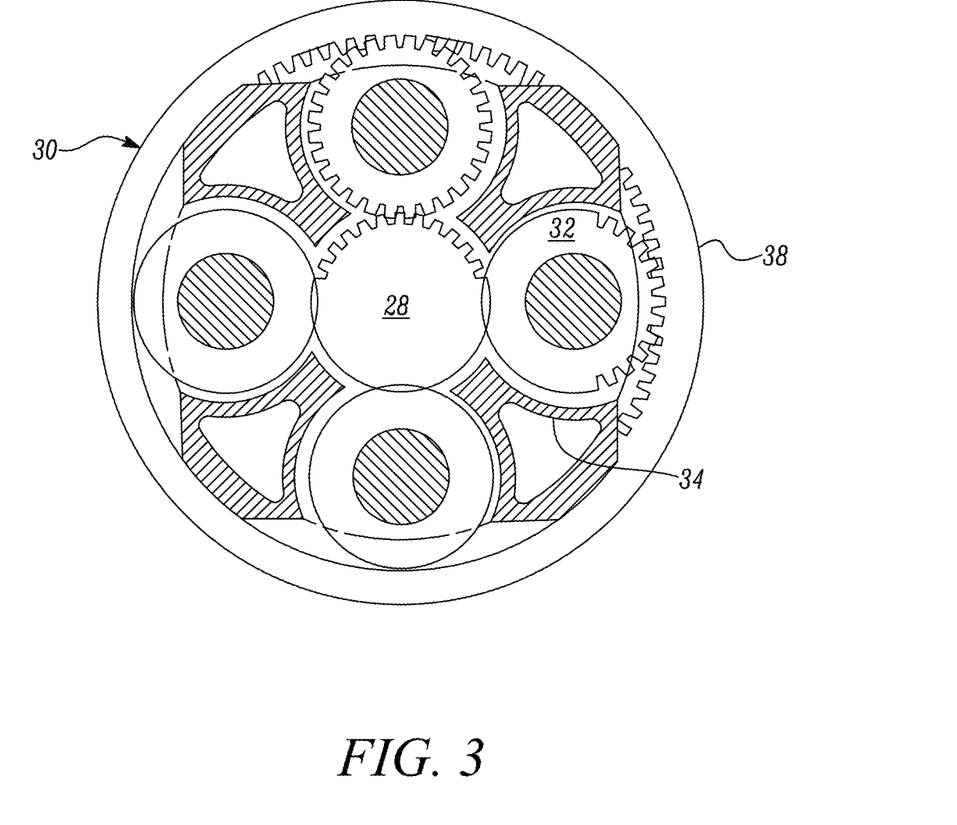
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
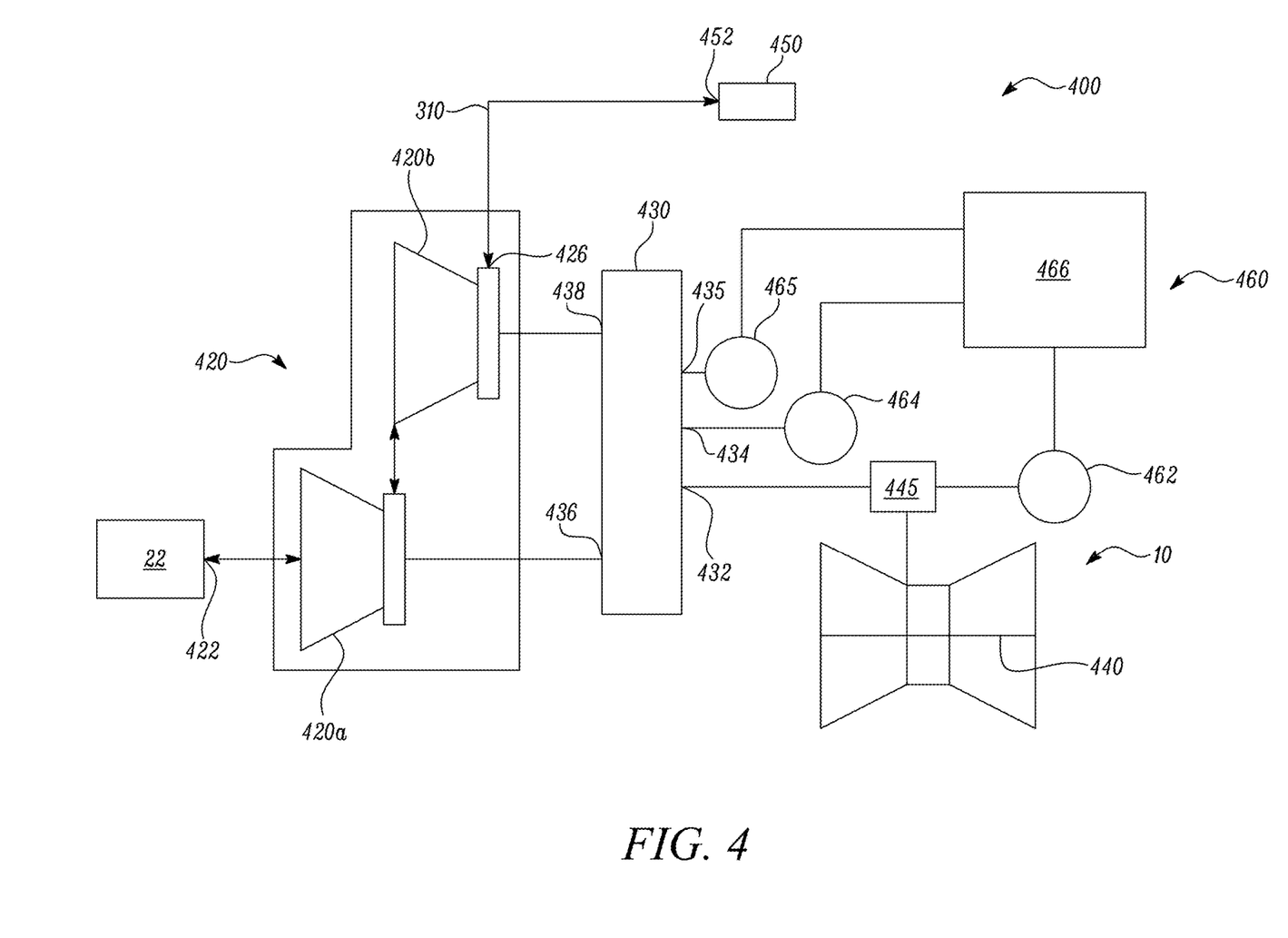
FIG. 4 is a schematic view of a blower system, according to arrangements of the present disclosure, for supplying air to an airframe system.

A blower system 400, according to arrangements of the present disclosure, for supplying air to an airframe system 450 is shown schematically in FIG. 4. The blower system 400 comprises a blower compressor 420 configured to be mechanically coupled to a spool 440 of a gas turbine engine, such as the gas turbine engine 10. The expression "spool" is used herein to denote a shaft of the engine which interconnects a compressor and a turbine of the engine core, and/or engine components which rotate together with such an engine shaft (e.g., the compressor and turbine interconnected by the shaft, and associated rotating components such as drums and disks).

The blower compressor 420 comprises a first rotor 420*a*, such as a low-pressure rotor, and a second rotor 420*b*, such as a high-pressure rotor. The first and second rotors 420*a*, 420*b* are independently rotatable.

The blower compressor 420 is configured to operate in a blower mode in which the blower compressor 420, e.g., the first and second rotors 420*a*, 420*b* are driven to rotate by the spool 440 to draw an inlet flow of gases through air inlet 422, such as an engine bypass duct port. The air inlet 422 is in fluid communication with an air source, such as a bypass duct 22 of the gas turbine engine. Accordingly, when operated in the blower mode, the blower compressor 420, e.g., the first rotor 420*a* and/or second rotor 420*b*, is configured to receive the inlet flow of gases from the bypass duct 22 of the gas turbine engine. As depicted, the second rotor 420*b* may be arranged to receive a flow of gases discharged by the first rotor 420*a*.

Flows of gases referred to within the present specification, such as the inlet flow of gases and the compressed gases discharged from the blower compressor may be, or be substantially comprised of, compressed air. Unless otherwise specified, the terms "flows of gases" and "flows of air" may be used interchangeably herein. It will be appreciated that when a flow of gases is referred to as a flow of air, then the flow may additionally comprise one or more other gases, e.g., contaminants, such as oil, oil mist, volatile organic compounds, burnt and unburnt hydrocarbons and/or any other contaminants present within the flow of air/gases.

The blower compressor 420, e.g., the second rotor 420*b*, is configured to discharge compressed gases via an air outlet, such as blower compressor discharge port 426 for supply to an airframe port 452 for an airframe air use (i.e., a particular application or purpose for which the air is supplied to the airframe). A delivery line 310 extends from the blower compressor discharge port 426 to the airframe port 452. The airframe port 452 is in, or configured to be in, fluid communication with the airframe system 450. The airframe air use may be, for example, one or more of wing anti-icing, fuel tank inerting, cargo bay smoke eradication, or aircraft cabin pressurisation.

The blower compressor 420, e.g., the first and second rotors 420*a*, 420*b*, is generally configured to compress the inlet flow of air by converting kinetic energy of the inlet flow of air into pressure energy and heat energy. The blower compressor 420 may be any suitable type of compressor. As shown in the FIG. 4, the blower compressor 420 may be a centrifugal compressor.

The blower system 400 further comprises a variable transmission 430 for mechanically coupling the blower compressor 420, e.g., the first and second rotors 420*a*, 420*b*, to the spool 440. The variable transmission 430 allows a rotational speed of the first and second rotors 420*a*, 420*b* of the blower compressor 420 to be decoupled from a rotational speed of the spool 440, so that a performance of the blower system 400 is not solely governed by an operating speed of the gas turbine engine (e.g., it can be controlled to operate at a target speed independent of the rotational speed of the spool, and/or at a variable speed ratio relative to the rotational speed of the spool). Further, as described in detail below, the variable transmission 430 allows the rotational speed of the first and second rotors 420*a*, 420*b* to be varied independently of one another. Inclusion of a variable transmission 430 within the blower system 400 therefore provides more versatile and adaptable means for supplying pressurised air to an airframe system.

The variable transmission 430 comprises a first input 432 configured to receive drive from the spool 440 of the gas turbine engine. The gas turbine engine may comprise an accessory gearbox 445 coupled to the spool 440, and the variable transmission 430 may be coupled to the spool 440 via the accessory gearbox 445.

As depicted, the blower system 400 may further comprise an electrical variator 460 for varying the speed of first and second outputs 436, 438 of the variable transmission 430 relative to the speed of the input provided to the first input 432, e.g., from the spool 440. The electrical variator 460 may comprise a first electrical machine 464, a second electrical machine 465, a third electrical machine 462 and an electrical power management system 466 operatively coupled to the first, second, and third electrical machines 464, 465, 462. The first, second and third electrical machines 464, 465, 462 may be motor-generators comprising an electric stator and an electric rotor. The third electrical machine 462, e.g., the shaft of the third electrical machine, may be operatively coupled to the spool 440. In particular, an electric rotor of the third electrical machine 462 may be operatively coupled, e.g., directly coupled or coupled via one or more gears and/or couplings, to the accessory gearbox 445. When the blower compressor 420 is operating in the blower mode, the third electrical machine 462 may be operated as a generator to convert mechanical power received from the spool 440 to electrical power. The first electrical machine 464 may be operated as a motor and may receive at least a portion of the electrical power generated by the third electrical machine 462 via the electrical power management system 466. Electric stators of the first and third electrical machines 464, 462 may be electrically coupled to the electrical power management system 466 in order for the electrical power generated by the third electrical machine 462 to be supplied to the first electrical machine 464. The second electrical machine 465 may similarly be operated as a motor and may receive at least a portion of the electrical power generated by the third electrical machine 462 via the electrical power management system 466. The electric stator of the second electrical machine may be electrically coupled to the electrical power management system 466 so that the second electrical machine can receive power from the third electrical machine via the electrical power management system 466.

The variable transmission 430 further comprises a second input 434 and a third input 435. The second input 434 may be configured to receive drive from the first electrical machine 464 and the third input may be configured to receive drive from the second electrical machine 465. For example, the electric rotor of the first electrical machine 464 may be operatively, e.g., mechanically, coupled to the second input and the electric rotor of the second electrical machine 465 may be operatively, e.g., mechanically, coupled to the third input 435. The first electrical machine 464 may be operable by the electrical power management system 466 to drive the variable transmission 430, e.g., the second input of the variable transmission, in either direction. Similarly, the second electrical machine 465 may be operable by the electrical power management system 466 to drive the variable transmission 430, e.g., the third input of the variable transmission, in either direction.

The variable transmission 430 may be configured such that the speed of the first output 436 from the variable transmission 430 is determined by the speeds of the first and second inputs 432, 434. For example, the speed of the first output 436 may correspond to the sum of the speeds of the first and second inputs. Alternatively, the variable transmission may be configured such that the speed of the first output 436 varies based on the speeds of the first and second inputs 432, 434 in any other way.

Further, the variable transmission 430 may be configured such that the speed of the second output 438 from the variable transmission 430 is determined by the speeds of the first and third inputs 432, 435. For example, the speed of the second output 438 may correspond to the sum of the speeds of the first and third inputs 432, 435. Alternatively, the variable transmission 430 may be configured such that the speed of the second output 438 varies based on the speeds of the first and third inputs 432, 435 in any other way.

The electrical power management system 466 may be configured to control the operation of the first electrical machine 464, e.g., the power supplied to the first electrical machine, in order to control the speed of the first output 436. The power management system 466 may be configured to provide a continuously variable difference between the power received from the third electrical machine 462 and the power output to the first electrical machine 464.

Similarly, the electrical power management system 466 may be configured to control the operation of the second electrical machine 465, e.g., the power supplied to the second electrical machine, in order to control the speed of the second output 438. The power management system 466 may be configured to provide a continuously variable difference between the power received from the third electrical machine 462 and the power output to the second electrical machine 465. Further, the power supplied to the second electrical machine 465 may be controlled independently of the power supplied to the first electrical machine 464.

The electrical power management system 466 may include power electronics, for example one or more AC: DC converters, AC sides of which are connected to the electric stators of the electrical machines 462, 464, 465. The electrical power management system 466 may also include electrical storage in the form, for example, of one or more batteries, capacitors or similar. The electrical power management system 466 may also be configured to control the direction of rotation of the first and second electrical machines 464, 465. By varying the speed, direction and power of the first and second electrical machines 464, 465, the power management system 466 may be configured to independently control the speed and power supplied from the first and second outputs 436, 438 of the variable transmission 430 to the blower compressor 420, e.g., the first and second rotors 420a, 420b respectively.

In the arrangement depicted in FIG. 4, the variable transmission 430 comprises a differential epicyclic transmission. However, in other arrangements, the variable transmission may comprise any other kind of variable transmission.

In addition to operating in the blower mode, the blower system 400 may, in some examples, also be operated in a starter mode in which the blower compressor 420 operates in reverse as an expander to provide drive to the variable transmission 430 and thereby provide mechanical input to the gas turbine engine 10 to facilitate a start operation of the gas turbine engine.

In some arrangements, in the starter mode, the third electrical machine 462, may be operated as a motor and may receive power from the power management system 466. The power received by the third electrical machine 462 may be generated by the first electrical machine 464 and/or the second electrical machine 465 operating as generators, e.g., receiving mechanical power from the blower compressor 420 via the transmission 430. The mechanical power generated by the third electrical machine 462 may be added to that transmitted through the transmission 430 from the blower compressor 420, for driving rotation of the accessory gearbox 445 and thus the spool 440.

Figure 5:
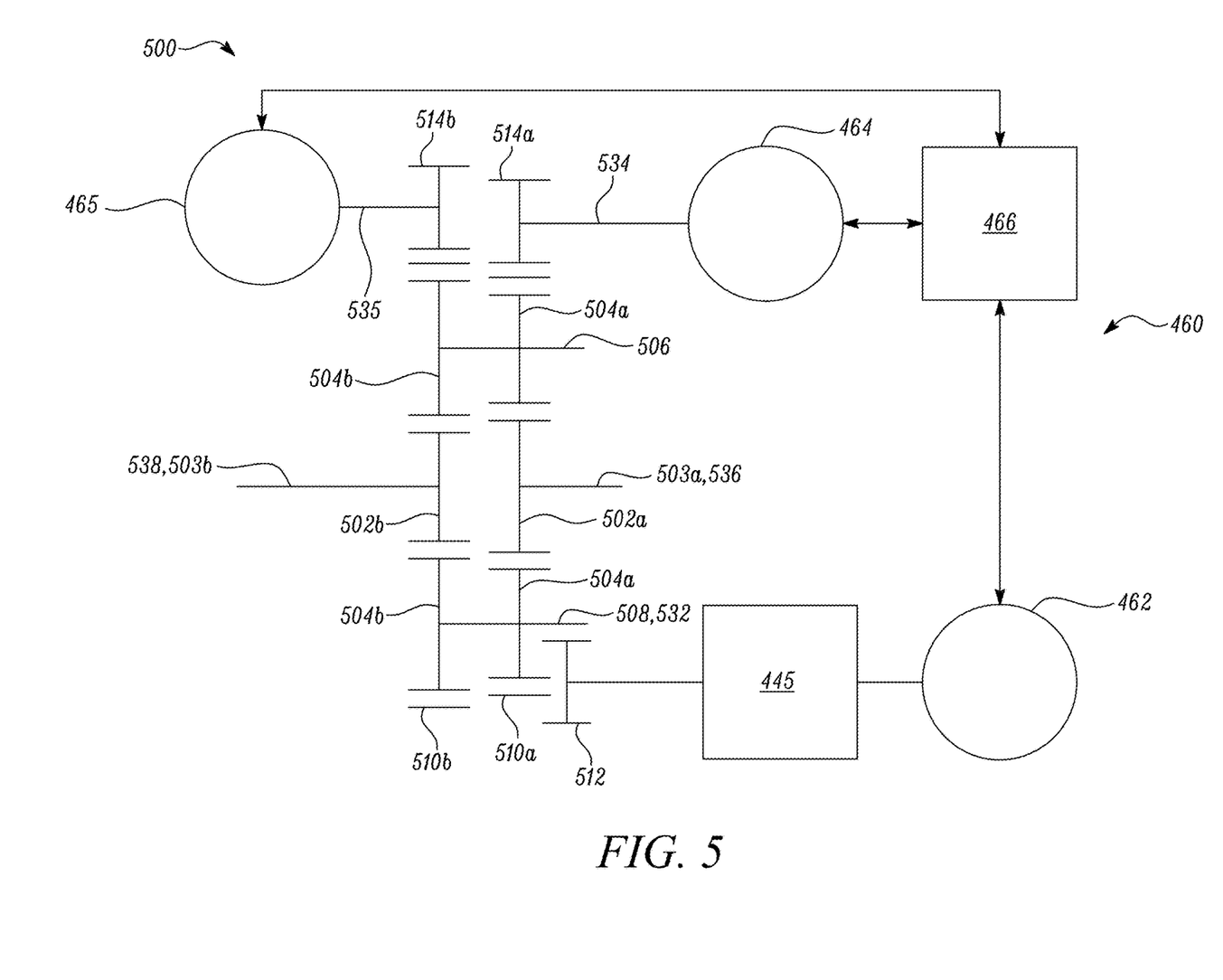
FIG. 5 is a schematic sectional view of a variable transmission, according to arrangements of the present disclosure, for the blower system shown in FIG. 4.

With reference to FIG. 5, a variable transmission 500 according to arrangements of the present disclosure will now be described. The variable transmission 500 may be provided as part of the blower system 400, e.g., in place of the variable transmission 430. The variable transmission 500 comprises a differential epicyclic transmission having first and second sun gears 502a, 502b, and first and second sets of planet gears 504a, 504b meshingly engaged with the first and second sun gears 502a, 502b respectively. The first and second sets of planet gears 504a, 504b may be supported about the respective sun gears by a common carrier 506. Although the planet gears within the first and second sets of planet gears 504a, 504b may be mounted coaxially on the carrier 506, the planet gears within the first set may be rotatable independently of the planet gears within the second set. A carrier gear 508 may be formed on the carrier 506 for rotation together with the sets of planet gears 504a, 504b about the respective sun gears 502a, 502b. A first ring gear 510a is disposed about the first set of planet gears 504a meshingly engaged with the planet gears in the first set, and a second ring gear 510b is disposed about the second set of planet gears 504b meshingly engaged with the planet gears in the second set. In the arrangement depicted in FIG. 5, the first and second ring gears are independently rotatable relative to one another. Each of the sun gears 502a, 502b, planet gears 504a, 504b, carrier gear 508 and ring gears 510a, 510b comprise teeth to intermesh with the other gears. However, for clarity the teeth are not illustrated in FIG. 5. Furthermore, in FIG. 5 there are two planet gears 504 illustrated in each set of planet gears 504a, 504b. However, it will be apparent to the skilled reader that any number of planet gears may be provided in the first and/or second set 504a, 504b within the scope of the claimed invention.

In the arrangement illustrated in FIG. 5, the first rotor 420a of the blower compressor may be operatively coupleable to the first sun gear 502a for rotation together with the first sun gear 502a, e.g., such that the first rotor 420a rotates synchronously with the first sun gear. For example, the first rotor 420a of the blower compressor may be coupleable, e.g., directly coupleable, to a first output shaft 503a coupled to, and extending from, the first sun gear 502a. The second rotor 420*b* of the blower compressor may be operatively coupleable to the second sun gear 502*b* for rotation with the second sun gear, e.g., such that the second rotor 420*b* rotates synchronously with the second sun gear 502*b*. For example, the second rotor 420*b* of the blower compressor may be coupleable, e.g., directly coupleable, to a second output shaft 503*b* coupled to, and extending from, the second sun gear 502*b*. Accordingly, the first output 536 of the variable transmission 500 may be formed by the first sun gear 502*a*, or the first output shaft 503*a*, and the second output 538 may be formed by the second sun gear 502*b*, or the second output shaft 503*b*.

The spool 440 is operatively coupleable to the carrier gear 508, e.g. via the accessory gear box 445 and/or a spool spur gear 512 meshingly engaged with the carrier gear 508. In other words, the first input 432 may be formed by the carrier gear 508.

The first electrical machine 464 is operatively coupled to the first ring gear 510*a* and the second electrical machine 467 is operatively coupled to the second ring gear 510*b*. For example, the first and second electrical machines 464, 465 may be coupled to the first and second ring gears via respective variator spur gears 514*a*, 514*b*. The second input 434 may thereby be formed by the first ring gear 510*a* and the third input may be formed by the second ring gear 510*b*.

As illustrated in FIG. 5, shafts 503*a*, 503*b* extending from the first and second sun gears 502*a*, 502*b* for forming the first and second outputs 536, 538 of the variable transmission respectively, extend away from the first and second sun gears in opposite directions from one another. The first and second outputs of the variable transmission 500 may thereby be provided on opposite sides of the variable transmission from one another. Accordingly, in arrangements of the blower system comprising the variable transmission 500, the first and second rotors 420*a*, 420*b* of the blower compressor may be arranged of opposite sides of the variable transmission.

Figure 6:
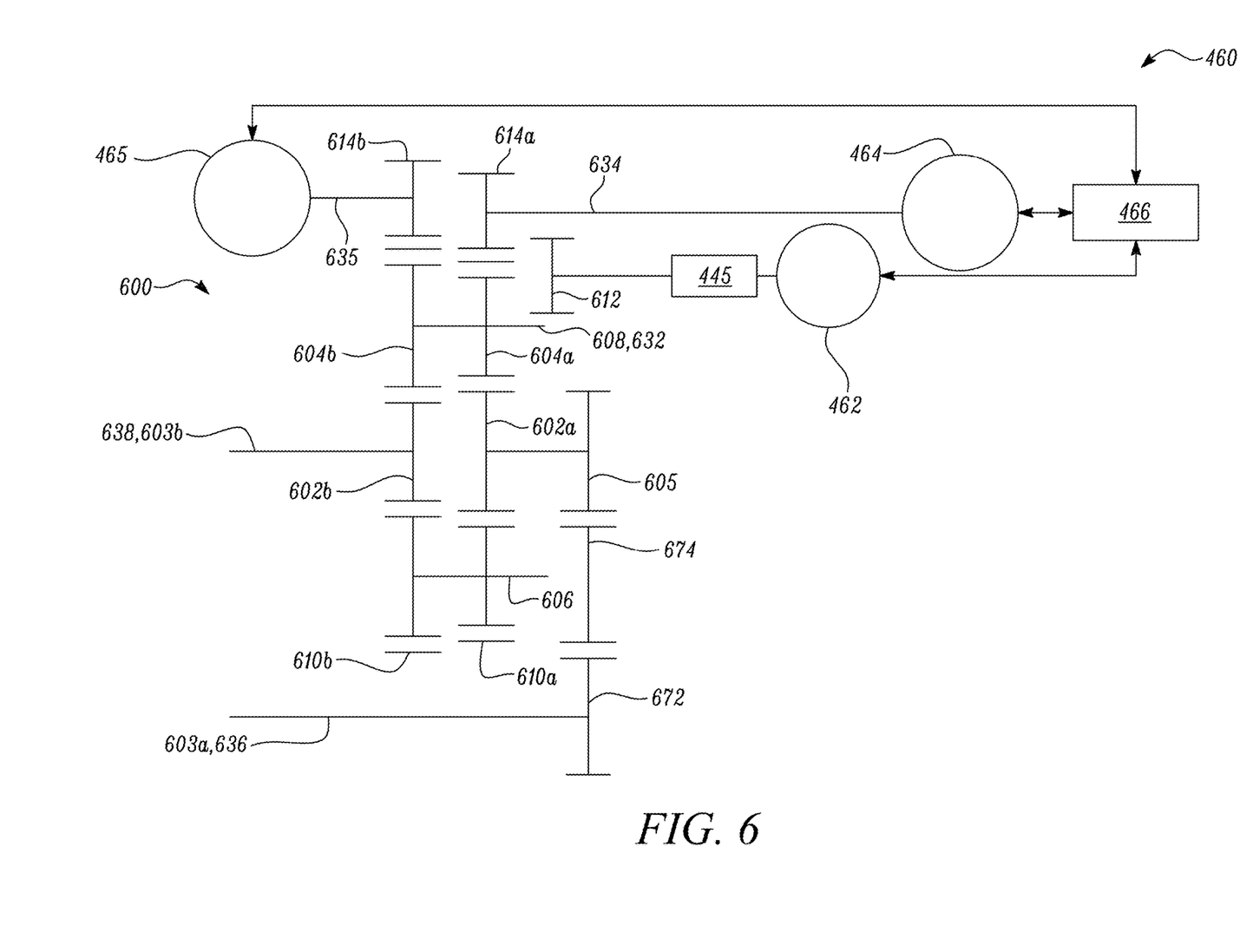
FIG. 6 is a schematic sectional view of another variable transmission, according to arrangements of the present disclosure, for the blower system shown in FIG. 4.
Figure 7:
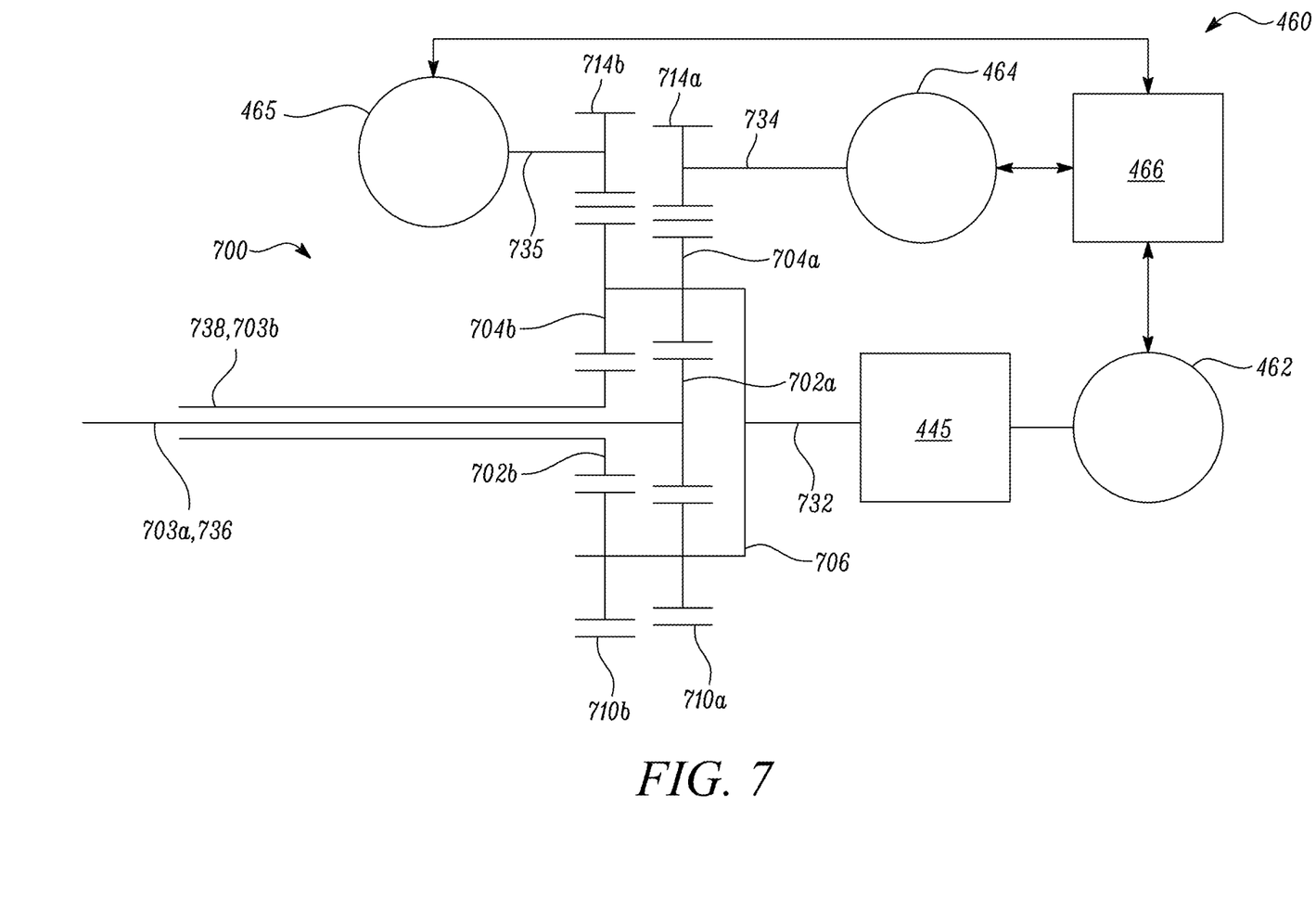
FIG. 7 is a schematic sectional view of another variable transmission, according to arrangements of the present disclosure, for the blower system shown in FIG. 4.
Figure 8:
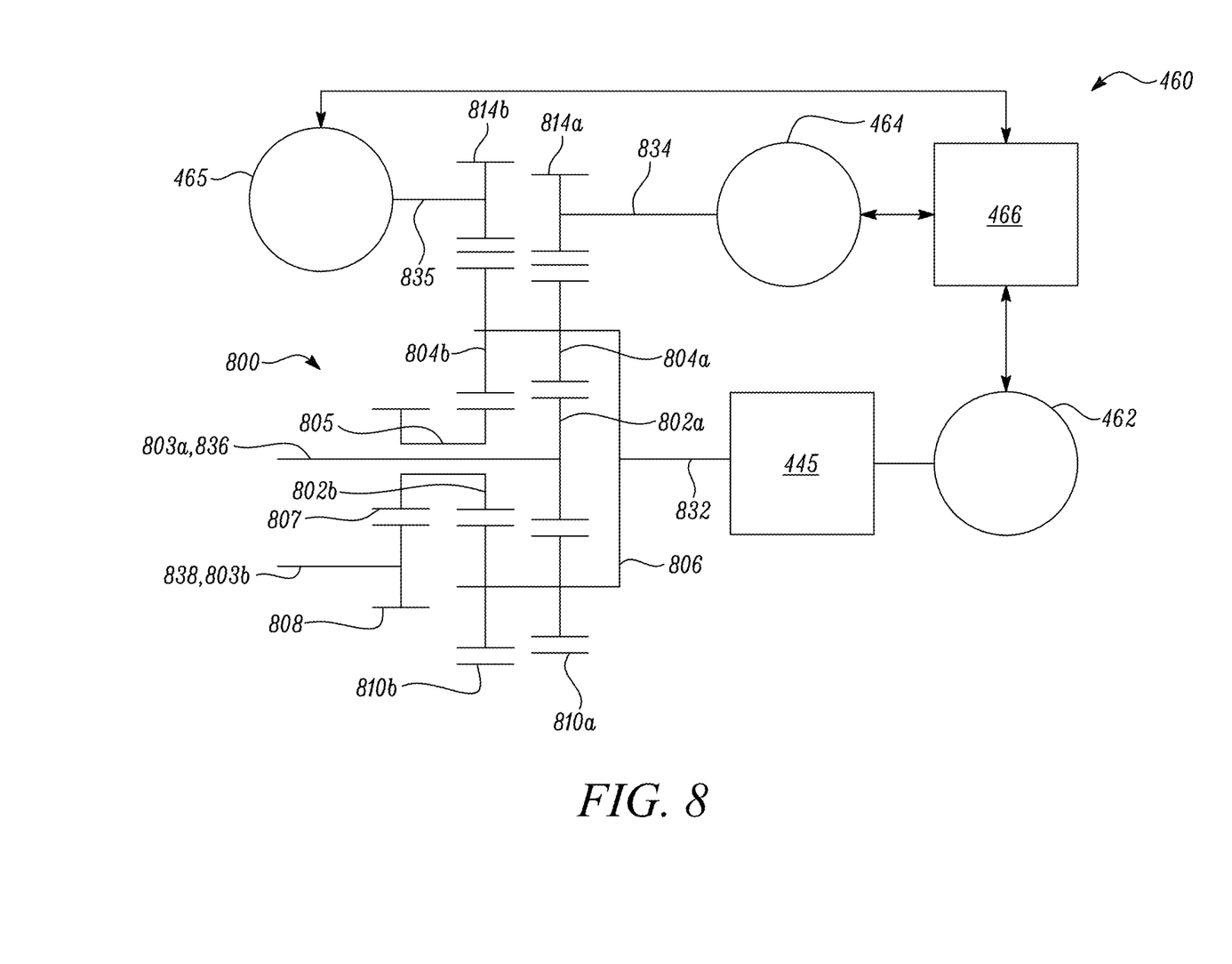
FIG. 8 is a schematic sectional view of another variable transmission, according to arrangements of the present disclosure, for the blower system shown in FIG. 4.

FIGS. 6, 7 and 8 depict alternative variable transmissions 600, 700, 800, which may be provided as part of the blower system 400, e.g., in place of the variable transmission 430, instead of the variable transmission 500. In the variable transmissions 600, 700, 800, output shafts 603*a*, 703*a*, 803*a*, 603*b*, 703*b*, 803*b* forming the first and second outputs 636, 736, 836, 638, 738, 838 of the variable transmissions extend from gears of the variable transmission in the same directions. In other words, the first and second outputs of the variable transmission may be provided on the same side of the variable transmissions 600, 700, 800 as one other. Such arrangements of the variable transmission may be provided within blower systems 400 in which the first and second rotors 420*a*, 420*b* of the blower compressor are arranged on the same side of the variable transmission as one another.

Referring in particular to FIG. 6, the variable transmission 600 may be similar to the variable transmission 500 and features described above in relation to the variable transmission 500 may apply equally to the variable transmission 600. In particular, the variable transmission 600 may comprise first and second sun gears 602*a*, 602*b*, first and second sets of planet gears 604*a*, 604*b* meshingly engaged with the first and second sun gears 602*a*, 602*b* respectively. The first and second sets of planet gears 604*a*, 604*b* may be supported about the respective sun gears by a common carrier 606. A carrier gear 608 may be formed on the carrier for rotation together with the sets of planet gears 604*a*, 604*b* about the respective sun gears 602*a*, 602*b*. A first ring gear 610*a* is disposed about the first set of planet gears 604*a* meshingly engaged with the planet gears in the first set, and a second ring gear 610*b* is disposed about the second set of planet gears 604*b* meshingly engaged with the planet gears in the second set.

The variable transmission 600 differs from the variable transmission 500 in that the variable transmission 600 further comprises a first driven gear 672 mechanically coupled to, and driven by, the first sun gear 602*a*. For example, the first driven gear 672 may be coupled to the first sun gear via an intermediate gear 674. The intermediate gear 674 may be meshingly engaged with the first sun gear. For example, the first sun gear 602*a* may be a compound gear having a set of teeth meshingly engaged with the first planet gears 604*a* and a second set of teeth meshingly engaged with the intermediate gear 674. Alternatively, as depicted in FIG. 6, the intermediate gear 674 may be meshingly engaged with an auxiliary sun gear 605 provided on the same shaft as the first sun gear 602*a*. As illustrated, an axis of the first driven gear may be offset from an axis of the first sun gear. In particular, the axis of the first driven gear may be offset from the sun gear by a distance greater than a radius of the first ring gear.

The first output 636 may be formed by the first output shaft 603*a* coupled to and extending from the first driven gear 672. The first output shaft 603*a* forming the first input may extend from the first driven gear 672 in the same direction as the second output shaft 603*b* forming the second input, which extends from the second sun gear, e.g., to the same side of the gears of the variable transmission 600. In this way, the first and second outputs may be provided on the same side as the variable transmission 600. However, in other arrangements, the first output shaft 603*a* may extend from the first driven gear 672 in the opposite direction.

Referring now to FIG. 7, the variable transmission 700 may be similar to the variable transmission 600 and features described in relation to the variable transmission 600 may apply equally to the variable transmission 700. In particular, the variable transmission 700 may comprise first and second sun gears 702*a*, 702*b* and first and second sets of planet gears 704*a*, 704*b* meshingly engaged with the first and second sun gears 702*a*, 702*b* respectively. The first and second sets of planet gears 704*a*, 704*b* may be supported about the respective sun gears by a common carrier 706. As depicted in FIG. 7, the carrier 706 may be directly driven by the accessory gear box 445. In alternative arrangements, the carrier 706 may comprise a carrier gear 708 and the carrier may be driven via a carrier spur gear meshingly engaged with the carrier gear. A first ring gear 710*a* is disposed about the first set of planet gears 704*a* meshingly engaged with the planet gears in the first set, and a second ring gear 710*b* is disposed about the second set of planet gears 704*b* meshingly engaged with the planet gears in the second set.

The variable transmission 700 differs from the variable transmission 500, 600 described above, in that a second output shaft 703*b* extending from the second planet gear 702*b* is tubular and a first output shaft 703*a* extending from the first planet gear 702*a* extends through a bore formed in the second planet gear 702*b* and through the hollow interior of the second output shaft 703*b*. In this way, the first and second output shafts 703*a*, 703*b* extend in the same direction as one another so that the first and second outputs are provided on the same side of the variable transmission. In other arrangements, the first output shaft 703*a* may be hollow and the second output shaft 703*b* may extend though a bore formed in the first sun gear 702*a* and through the hollow interior of the first output shaft 703*b*.

With reference to FIG. 8, a variable transmission 800 may be similar to the variable transmission 700 and the features described in relation to the variable transmission 700 may apply equally to the variable transmission 800. In particular, the variable transmission 800 may comprise first and second sun gears 802a, 802b, first and second sets of planet gears 804a, 804b meshingly engaged with the first and second sun gears 802a, 802b respectively and the first and second sets of planet gears 804a, 804b may be supported about the respective sun gears by a common carrier 806.

As illustrated, the variable transmission 800 may comprise a hollow, tubular sun gear shaft 805 coupled to and extending from the second sun gear 802b. The first output shaft 803a may extend from the first sun gear 802a through a bore formed in the second sun gear 802b and through the hollow interior of the sun gear shaft 805. The variable transmission 800 further comprises a second auxiliary sun gear 807 coupled to or formed at an opposite end of the sun gear shaft 805 from the second sun gear 802b.

The variable transmission 800 comprises an output spur gear 808 meshingly engaged with the second auxiliary sun gear 807, and the second output of the variable transmission may be formed by the output spur gear 808 or a second output shaft 803b extending from the output spur gear. As depicted, the second auxiliary sun gear 807 may have the same or substantially the same diameter as the second sun gear 802b and/or may comprise the same number of teeth as the second sun gear. Alternatively, the second auxiliary sun gear 807 may have a different number of teeth from the second sun gear.

In alternative arrangements, rather than comprising sun gear shaft and second auxiliary sun gear, the second sun gear 802b may be a compound gear having a first toothed portion and a second toothed portion, which may be spaced apart from one another along an axis of the sun gear. The second set of planet gears may be meshingly engaged with the first toothed portion, and the second spur gear 872 may be meshingly engaged with the second toothed portion. The first and second toothed portions may have the same or a different number of teeth from one another and/or may comprise teeth formed at the same or different diameters about the axis of the second sun gear 802b.

In further alternative arrangements, the hollow, tubular sun gear shaft 805 may be coupled to and extend from the first sun gear 802a. in such arrangements, the second output shaft 803b may extend from the second sun gear 802b through a bore formed in the first sun gear 802a and through the hollow interior of the sun gear shaft 805. The variable transmission may further comprise a first auxiliary sun gear coupled to or formed at an opposite end of the sun gear shaft 805 from the first sun gear 802a. In such arrangements, the variable transmission may comprise an output spur gear 808 meshingly engaged with the first auxiliary sun gear, and the first output of the variable transmission may be formed by the output spur gear 808 or a first output shaft 803a extending from the output spur gear.

Figure 9:
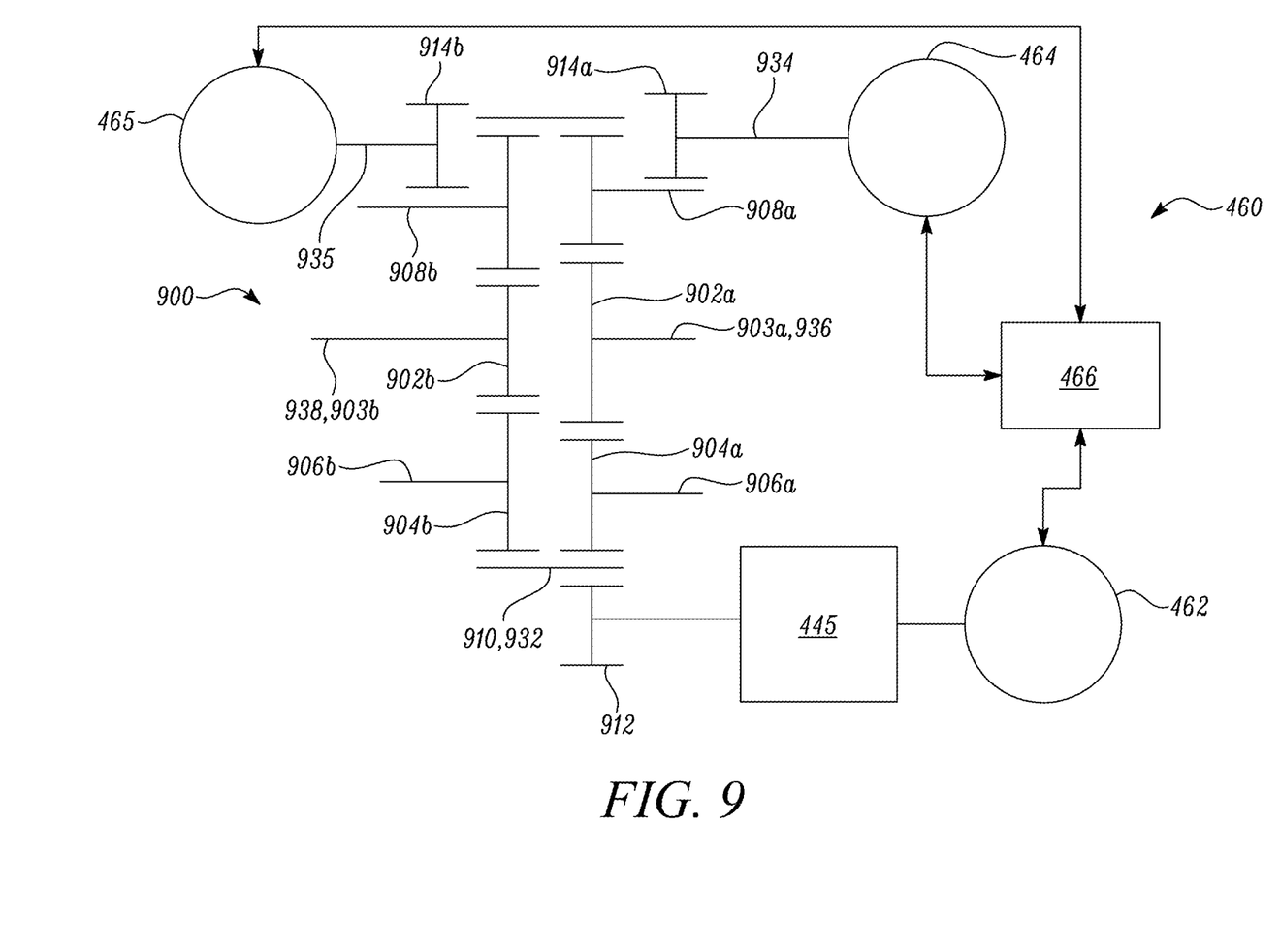
FIG. 9 is a schematic sectional view of another variable transmission, according to arrangements of the present disclosure, for the blower system shown in FIG. 4.

FIG. 9 illustrates an alternative variable transmission 900, which may be provided as part of the blower system 400, e.g., in place of the variable transmission 430, instead of one of the variable transmissions 500, 600, 700, 800. The variable transmission 900 is similar to the variable transmissions 500, 600, 700, 800 and features described in relation to the variable transmissions 500, 600, 700, 800 may apply equally to the variable transmission 900. In particular, the variable transmission 900 may comprise first and second sun gears 902a, 902b and first and second sets of planet gears 904a, 904b meshingly engaged with the first and second sun gears 902a, 902b respectively. The variable transmission 900 differs from the variable transmissions described above in that the variable transmission 900 comprises a first carrier 906a supporting the first set of planet gears 904a for rotation about the first sun gear 902a and a second carrier 906b supporting the second set of planet gears 904b for rotation about the second sun gear 902b. The variable transmission 900 further comprises first and second carrier gears 908a, 908b formed on the first and second carriers 906a, 906b respectively.

As depicted in FIG. 9, first and second variator spur gears 914a, 914b are meshingly engaged with the first and second carrier gears 908a, 908b respectively. As described above with reference to FIGS. 5 to 8, the first and second electrical machines 464, 465 are driving connected to the first and second variator spur gears respectively. Accordingly, the second and third inputs of the variable transmission 900 are formed by the first and second carrier gears respectively.

The variable transmission 900 further comprises a common ring gear 910 extending about and meshingly engaged with the first and second sets of planet gears 904a, 904b.

The variable transmission 900 depicted in FIG. 9 is similar to the variable transmission 500 in that a first output shaft 903a is coupled, e.g. directly coupled, to and extends from the first sun gear 902a and a second output shaft 903b is coupled, e.g. directly coupled, to and extends from the second sun gear 902b in an opposite direction from the first output shaft 903a. However, in other arrangements, the first and second output shafts of the variable transmission 900 may be configured in the same way as the first and second output shafts of the variable transmissions 600, 700, 800 described above with reference to FIGS. 7 to 9.

For example, a first driven gear (not shown) may be mechanically coupled to, and driven by, the first sun gear 902a in the same way as described above with reference to FIG. 6. In such an arrangement, the first output 936 may be formed by a shaft extending from the first driven gear, which may extend in the same direction as the shaft 903b forming the second input or the opposite direction.

Alternatively, the second output shaft 903b extending from the second sun gear 902b may be tubular and the first output shaft 903a extending from the first sun gear 902a may extend through a bore formed in the second sun gear 902b and through the hollow interior of the second output shaft 903b. In this way, the first and second output drive shaft may extend in the same direction so that the first and second outputs are provided on the same side of the variable transmission. In other arrangements, the first output shaft may be hollow and the second output shaft may extend though a bore formed in the first sun gear and through the hollow interior of the first output shaft.

Alternatively again, the variable transmission 900 may comprise a hollow sun gear shaft, similar to the sun gear shaft of the variable transmission described above with reference to FIG. 8. The hollow sun gear shaft may be coupled to and extend from the second sun gear. The first output shaft 903a may extend from the first sun gear 902a through a bore formed in the second sun gear and through the hollow interior of the sun gear shaft. In such arrangements, the variable transmission 900 further comprises a second auxiliary sun gear, similar to the second auxiliary sun gear 807 of the variable transmission 800, at an opposite end of the sun gear shaft from the second sun gear 902b. Further in such arrangements, the variable transmission 900 may comprise a second spur gear meshingly engaged with the second auxiliary sun gear, and the second output of the variable transmission may be formed by the second spur gear or a second output shaft 903b extending from the second spur gear.

The second auxiliary sun gear may have the same or substantially the same diameter as the second sun gear and/or may comprise the same number of teeth as the second sun gear. Alternatively, the second auxiliary sun gear may have a different number of teeth from the second sun gear.

In alternative arrangements, rather than comprising sun gear shaft and second auxiliary sun gear, the second sun gear may be a compound gear having a first toothed portion and a second toothed portion, which may be spaced apart from one another along an axis of the sun gear. The second set of planet gears may be meshingly engaged with the first toothed portion, and the second spur gear may be meshingly engaged with the second toothed portion. The first and second toothed portions may have the same or a different number of teeth from one another and/or may comprise teeth formed at the same or different diameters about the axis of the second sun gear 902b.

The variable transmission 900 may thereby be configured such that the first and second outputs are provided on the same side of the variable transmission as each other, in the any of the ways described above.

Figure 10:
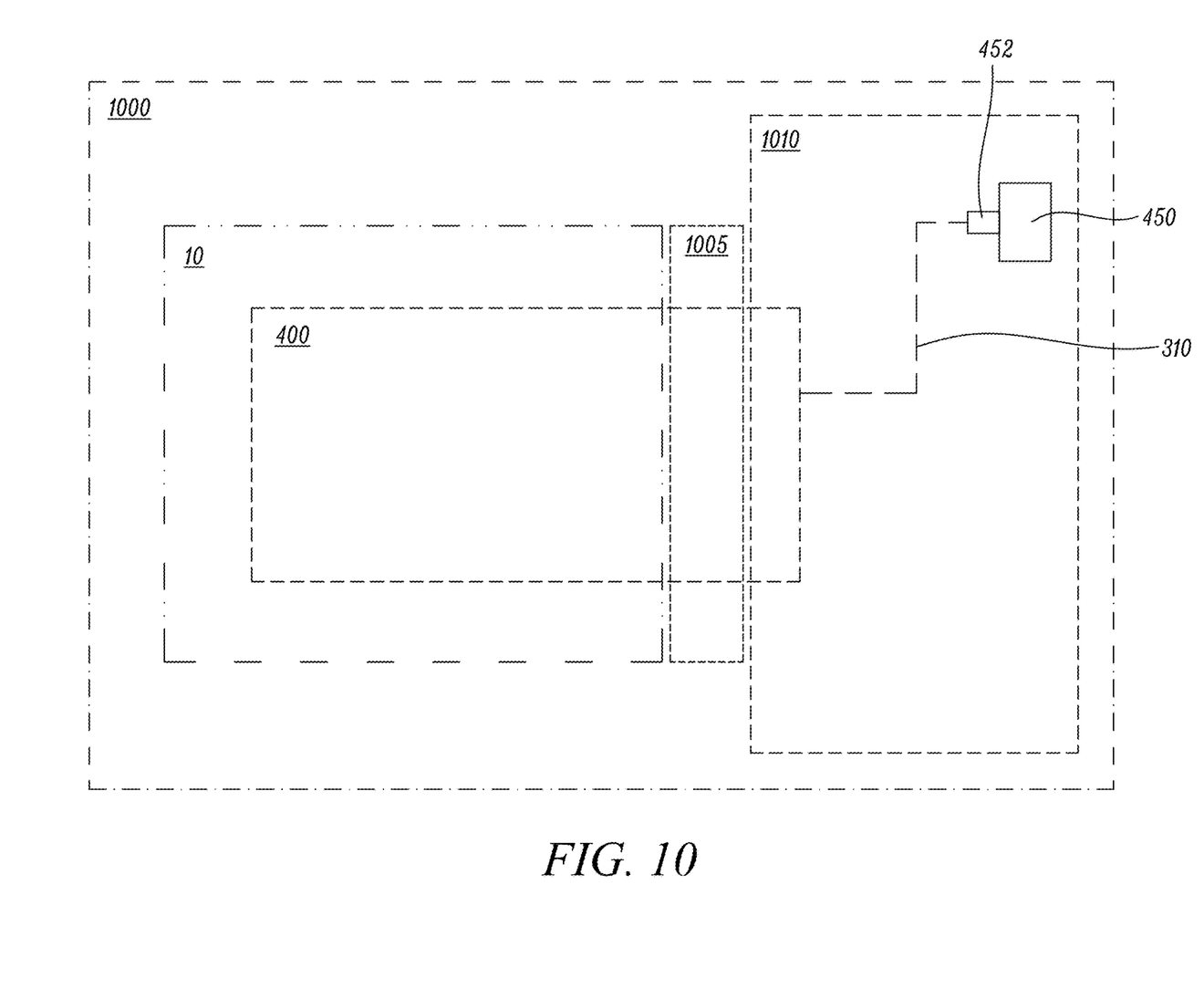
FIG. 10 is a schematic diagram of an aircraft including an airframe, a gas turbine engine and a blower system.

FIG. 10 shows a schematic view of an aircraft 1000 which includes an airframe 1010, a gas turbine engine 10, a pylon 1005 and the blower system 400. The pylon 1005 is configured to attach the gas turbine engine 10 to the airframe 810 (e.g., to a wing of the airframe 1010), as will be appreciated by those of ordinary skill in the art. The gas turbine engine 10 may be in accordance with the gas turbine engine 10 described above with reference to FIGS. 1 to 3. The blower system 400 of the aircraft 1000 may have any suitable combination of the features described above with respect to the blower systems 400 described above. The blower system 400 may be at least partially disposed within the gas turbine engine 10, at least partially disposed within the pylon 1005 and/or at least partially disposed within the airframe 1010. For instance, the blower compressor 420 may be disposed within the gas turbine engine 10. The airframe 1010 comprises the airframe system 450 to which the airframe port 452 is configured to supply conditioned and compressed (i.e., pressurised) air from the blower system 400.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. The scope of protection is defined in the appended claims.

I claim:

1. A blower system for supplying pressurized air to an airframe of an aircraft, the blower system comprising:
   an air inlet for receiving air from an air source;
   an air outlet for supplying pressurized air to the airframe;
   a blower compressor in fluid communication with the air inlet and the air outlet, the blower compressor comprising a first rotor and a second rotor, wherein the first and second rotors are independently rotatable in order to compress air received from the air inlet and deliver the compressed air to the air outlet;
   a variable transmission comprising a first output for driving the first rotor, a second output for driving the second rotor, and first, second and third inputs; and
   first and second electrical machines, each comprising an electric rotor and an electric stator, wherein:
   the first input of the variable transmission is configured to be mechanically coupled to a spool of a gas turbine engine;
   the second input of the variable transmission is mechanically coupled to the electric rotor of the first electrical machine;
   the third input of the variable transmission is mechanically coupled to the electric rotor of the second electrical machine; and
   the electric stators of the first and second electrical machines are electrically connected to an electrical power management system configured to control the supply of electrical power to the first and second electrical machines in order to control the speed of the first and second outputs of the variable transmission.

2. The blower system of claim 1, wherein the system further comprises a third electrical machine comprising an electric rotor and an electric stator, wherein the electric rotor of the third electrical machine is configured to be mechanically coupled to the spool of the gas turbine engine of the aircraft, whereby the third electrical machine is operable to generate electrical power from the spool of the gas turbine engine, and wherein the electric stator of the third electrical machine is electrically connected to the electrical power management system for supplying the generated electrical power to the electrical power management system.

3. The blower system of claim 2, wherein the electric stators of the first and second electrical machines are operable to receive electrical power generated by the third electrical machine.

4. The blower system of claim 1, wherein the variable transmission comprises two sun gears, two sets of planet gears meshingly engaged with the two sun gear respectively, and two ring gears meshingly engaged with the two sets of planet gear respectively.

5. The blower system of claim 4, wherein the first input is formed by a common planet carrier of the first and second sets of planet gears.

6. The blower system of claim 4, wherein the second input is formed by a first ring gear of the two ring gears and the third input is formed by a second ring gear of the two ring gears.

7. The blower system of claim 4, wherein the first output is formed by a first sun gear of the two sun gears and the second output is formed by a second sun gear of the two sun gears.

8. The blower system of claim 4, wherein the variable transmission further comprises:
   a first driven gear mechanically coupled to a first sun gear of the two sun gears;
   a first output shaft coupled to the first driven gear for mechanically coupling the first driven gear to the first rotor of the blower compressor; and
   a second output shaft mechanically coupled to a second sun gear of the two sun gears for mechanically coupling the second sun gear to the second rotor of the blower compressor, wherein the first and second output shafts extend away from the first and second sun gears respectively in the same direction as one another.

9. The blower system of claim 4, wherein the variable transmission further comprises:
   a first output shaft mechanically coupled to a first sun gear of the two sun gears for mechanically coupling the first sun gear to the first rotor of the blower compressor; and
   a second output shaft mechanically coupled to a second sun gear of the two sun gears for mechanically coupling the second sun gear to the second rotor of the blower compressor, wherein the first output shaft extends through a hollow interior of the second output shaft.

10. The blower system of claim 9, wherein the variable transmission further comprises an output spur gear meshingly engaged with an auxiliary sun gear coupled to the second sun gear via a sun gear shaft, wherein the output spur gear is for mechanically coupling to the second rotor of the blower compressor.

11. The blower system of claim 1, wherein the variable transmission comprises two sun gears, two sets of planet gears meshingly engaged with the two sun gear respectively, and a common ring gear meshingly engaged with the two sets of planet gears.

12. The blower system of claim 11, wherein the first input is formed by the common ring gear.

13. The blower system of claim 11, wherein the second input is formed by a first planet carrier of one of the sets of planet gears, and the third input is formed by a second planet carrier of the other of the sets of planet gears.

14. The blower system of claim 1, wherein one of the first and second rotors is a low pressure rotor of the blower compressor and the other of the first and second rotors is a high pressure rotor of the blower compressor.

15. A gas turbine engine for an aircraft, the gas turbine engine comprising the blower system of claim 1.

16. The gas turbine engine of claim 15, further comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft.

17. The gas turbine engine according to claim 16, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

18. An aircraft comprising:
a gas turbine engine according to claim 15.

19. An aircraft comprising:
a blower system according to claim 1.

* * * * *